(12) United States Patent
Cavanna

(10) Patent No.: US 6,976,773 B2
(45) Date of Patent: Dec. 20, 2005

(54) PIVOT CAPSULE FOR A MOTOR VEHICLE HEADLAMP

(75) Inventor: Jean-François Cavanna, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 148 days.

(21) Appl. No.: 10/678,515

(22) Filed: Oct. 2, 2003

(65) Prior Publication Data

US 2004/0141331 A1 Jul. 22, 2004

(30) Foreign Application Priority Data

Oct. 4, 2002 (FR) .................................. 02 12374

(51) Int. Cl.[7] .............................................. F21V 17/02
(52) U.S. Cl. ...................... 362/515; 362/528; 362/427; 362/428
(58) Field of Search ................................ 362/514, 515, 362/528, 529, 530–532, 427, 428, 287; 403/141, 403/142, 289, 122, 115, 348

(56) References Cited

U.S. PATENT DOCUMENTS

| | | | |
|---|---|---|---|
| 4,797,019 A | * | 1/1989 | Wood, Jr. .................... 403/133 |
| 5,011,322 A | * | 4/1991 | Schauwecker ............... 403/141 |
| 5,107,406 A | | 4/1992 | Sekido et al. |
| 5,186,532 A | * | 2/1993 | Ryder et al. ................. 362/528 |
| 5,564,853 A | * | 10/1996 | Maughan ..................... 403/137 |
| 6,113,301 A | * | 9/2000 | Burton ........................ 403/122 |
| 6,871,989 B2 | * | 3/2005 | Nakazawa et al. ........... 362/515 |

FOREIGN PATENT DOCUMENTS

FR 2 711 101 A1 4/1995

OTHER PUBLICATIONS

French Patent Office; Preliminary Search Report dated Jun. 24, 2003, of corresponding French Patent Application No. FR 02 12 374; filed Oct. 04, 2002; (2 pp.).

* cited by examiner

Primary Examiner—Thomas M. Sember
(74) Attorney, Agent, or Firm—Morgan & Finnegan, LLP

(57) ABSTRACT

A pivot capsule for a motor vehicle headlamp has a seating receiving a substantially spherical head of a fixing rod of substantially axial orientation extending from a housing of the headlamp to allow the lighting module to pivot. The seating is open at its two transverse ends. The seating has a channel which receives the head, and at least two lugs extending with play on both sides of the channel and the head. The recurved arms incorporate ends bearing on the head substantially at its junction with the rod to hold it securely in the channel. An additional retaining element of the pivot capsule is intended to be inserted via an open end of the seating and which includes at least one retaining surface.

6 Claims, 2 Drawing Sheets

US 6,976,773 B2

PIVOT CAPSULE FOR A MOTOR VEHICLE HEADLAMP

FIELD OF THE INVENTION

The invention relates to a pivot capsule for a headlamp for a motor vehicle.

BACKGROUND OF THE INVENTION

The invention relates more particularly to a pivot capsule for a motor vehicle headlamp, of the type including an end designed to be fixed to a rear face of a lighting module, in particular a reflector, and an opposite end incorporating a seating receiving a substantially spherical head of a fixing rod of substantially axial orientation extending from a front face of a housing of the lamp unit to allow the lighting module to pivot relative to the housing, of the type in which the seating is open at its two transverse ends and includes a bottom wall incorporating a channel formed into a portion of a cylinder of substantially transverse orientation and having a curvature corresponding to that of the spherical head, which receives the end of the substantially spherical head, and at least two parallel flexible retaining lugs extending with play on both sides of the channel and of the spherical head, and which includes recurved arms turned towards the channel of which the ends, formed into a portion of a cylinder of substantially transverse orientation and having a curvature corresponding to that of the spherical head, bear on the spherical head substantially at its junction with the rod to hold it securely in the channel.

Numerous examples of such pivot capsules are known. These capsules are notably designed to allow a small transverse displacement of the spherical head of the rod, while other capsules are also known in the existing state of the art which include a seating of substantially spherical shape into which the sphere is inserted, but which do not permit transverse displacement of the spherical head.

A major drawback of such capsules, compared with capsules incorporating a seating of spherical shape, is that the head is held only by the ends of the arms gripping the spherical head. For this reason, when the capsule is subjected to physical stresses such as vibration originating from the vehicle, the capsule deteriorates rapidly in the area of attachment to the sphere, notably at the ends of the recurved arms of the capsule. This damage can result in maladjustment of the light beam produced by the lighting module.

To overcome this drawback, the invention proposes a capsule including additional means of retaining the spherical head which nevertheless permits transverse movement of the latter in the capsule.

To this end, the invention proposes a capsule of the type described previously, characterised in that it includes an additional retaining element intended to be inserted via an open end of the seating and which includes at least one retaining surface which is intended to be located in contact with the spherical head to improve its means of support.

SUMMARY OF THE INVENTION

According to other characteristics of the capsule:
the additional retaining element includes at least one retaining surface having a curvature corresponding to that of the spherical head;
the additional retaining element is formed in the shape of a ring incorporating a hole of which one edge delimits at least one retaining surface;
the hole includes a part which delimits a generally spherical retaining surface of the same radius as the spherical head;
the additional retaining element incorporates two flanges of transverse orientation each of which is located between the channel and the adjacent lug of the capsule, so as to guide the additional retaining element in a transverse sliding motion while holding the additional retaining element in an orientation perpendicular to the transverse direction;
the additional retaining element includes at least one inclined ramp which is designed to engage with the spherical head to facilitate alignment of the spherical head relative to the additional retaining element.

Other features and advantages of the invention will become apparent upon reading the following detailed description, for a complete understanding of which reference should be made to the attached drawings wherein:

DESCRIPTION OF THE PREFERRED EMBODIMENTS

In the following description, identical reference numbers designate components that are identical or have similar functions.

Figure 1:
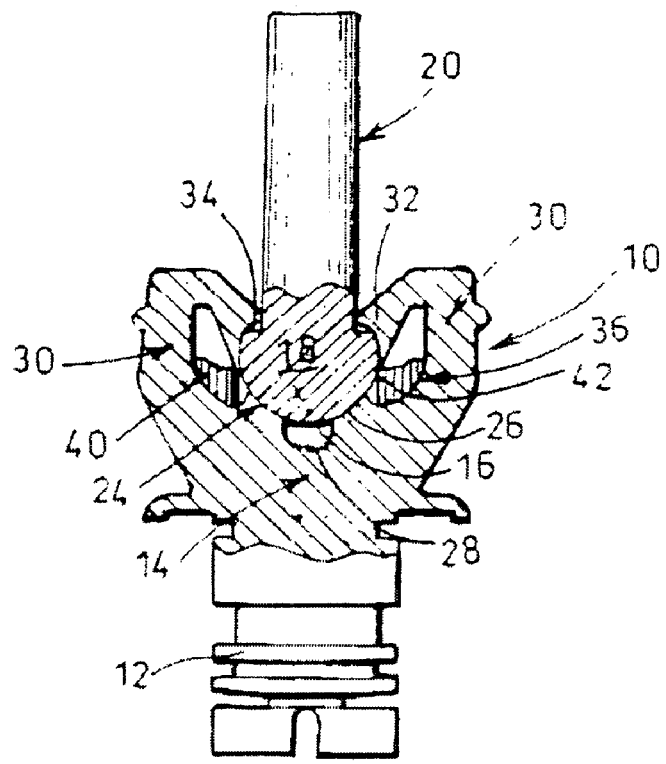
FIG. 1 is a partial axial cross-sectional view of a capsule according to the invention receiving the spherical head of an axial fixing rod and provided with its additional retaining element.

In a known manner, and as illustrated in FIG. 1, a pivot capsule 10 for a motor vehicle headlamp (not shown) includes an end 12 intended to be attached to a rear face of a lighting module, in particular a reflector (not shown), and an opposite end 14 incorporating a seating 16 receiving a substantially spherical head 18 of a fixing rod 20 of substantially axial orientation extending from a front face of a housing (not shown) of the headlamp unit to allow the lighting module to pivot relative to the housing.

Figure 2:
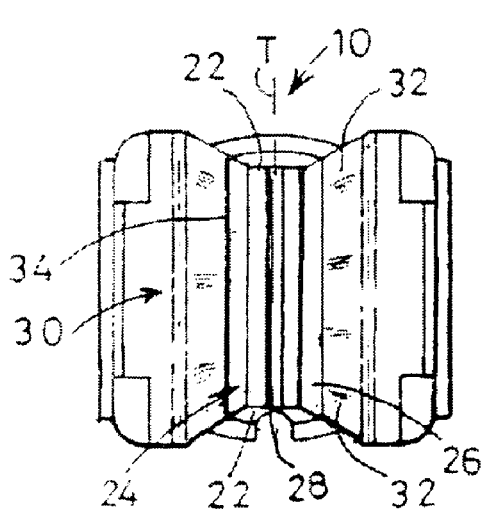
FIG. 2 is a top view of a capsule not fitted with its additional retaining element and the spherical head.

In a known manner, as illustrated in FIG. 2, the seating 16 emerges at its two transverse ends 22 and includes a bottom wall 24 incorporating a channel 26 in the shape of a portion of a cylinder oriented in a substantially transverse direction "T", and having a curvature corresponding to that of the spherical head 18. The channel 26 receives the end of the substantially spherical head 18.

As shown in FIGS. 1 and 2, the bottom wall 24 includes a channel 26 at the bottom of which is formed a groove 28 designed in a known manner to limit friction of the spherical head 18 in contact with the bottom wall 24.

The seating 16 also comprises at least two parallel flexible retaining lugs 30 which extend with play on both sides of the channel 26 and the spherical head 18. These lugs 30 comprise recurved arms 32 turned towards the channel 26 of which the ends 34, shaped as a portion of a cylinder of substantially transverse orientation and curvature corresponding to that of the spherical head 18, bear on the spherical head 18 substantially at its junction with the rod 20 to keep it supported in the channel 26.

In a known manner, the lugs 30 are flexible in a direction perpendicular to the transverse direction "T" so as to be able to move apart on passage of the head 18 and to close around the head 18 once it has moved past the arms 32 of the lugs 30.

Figure 4:
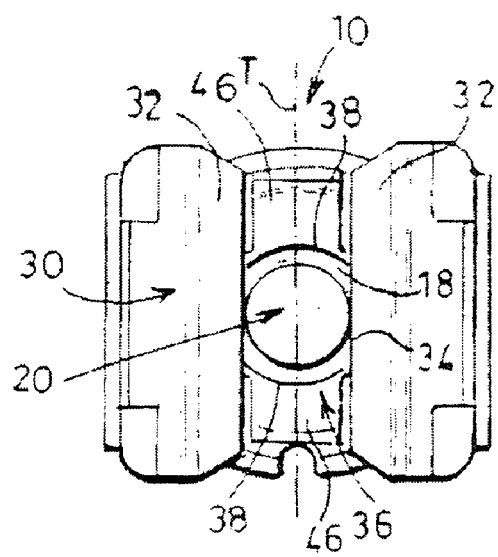
FIG. 4 is a top view of a capsule with its additional retaining element and the spherical head attached.
Figure 3:
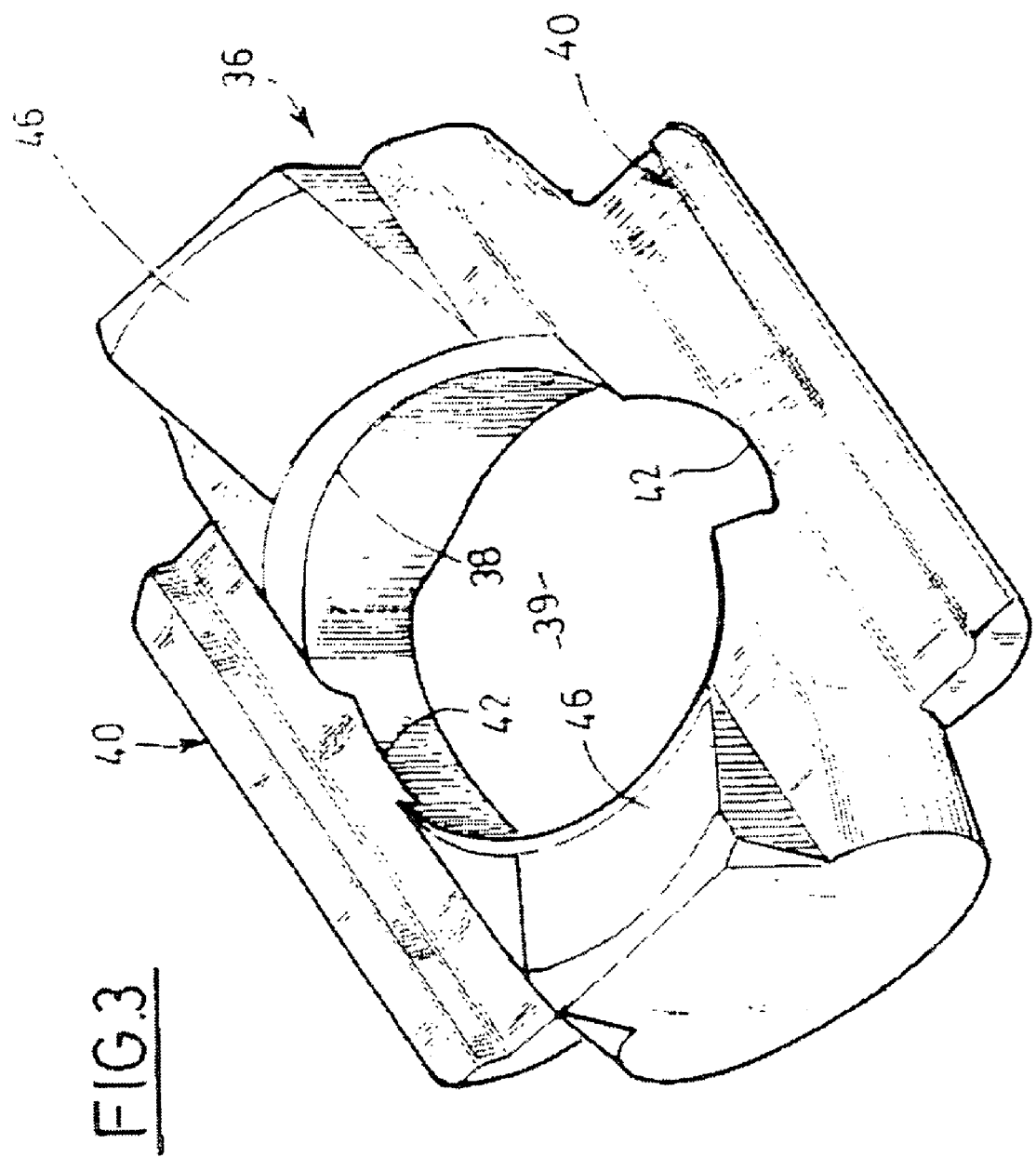
FIG. 3 is a perspective view showing the additional retaining element.

According to the invention, as illustrated in FIGS. 3 and 4, the capsule 10 includes an additional retaining element 36 intended to be inserted via an open end 22 of the seating 16 and which includes at least one retaining surface 38 having a curvature corresponding to that of the spherical head 18, which is intended to be placed in contact with the spherical head 18 to improve its means of support.

According to the embodiment shown in FIG. 3, the additional retaining element 36 is shaped in the form of a ring which includes a substantially spherical central hole 39 of the same overall diameter as the spherical head 18.

The hole 39 includes an upper part 38, on the side of the fixing rod 20, which forms a spherical retaining surface 38 having a curvature corresponding to that of the spherical head 18.

Here the lower part of the hole 39 is substantially cylindrical.

In this configuration, the head 18 can therefore be held completely captive in a seating 16 delimited by the hole 39 in the additional retaining element 36, the part 38 of which complements the spherical shape of the head 18, thereby ensuring that the latter is held in an optimal manner.

The additional retaining element 36 includes, on either side of the hole 39, two flanges 40 of transverse orientation, each of which is designed to be located between the channel 26 and one of the adjacent lugs 30 of the capsule 10, so as to immobilise the additional retaining element 36 in a direction perpendicular to the transverse direction "T" while permitting transverse displacement of the additional retaining element 36.

The flanges 40 are profiled so as to allow them to slide transversely in the seating 16.

It is to be noted that the additional retaining element 36 is introduced into the capsule 10 before the spherical head 18 is inserted.

Advantageously, the additional retaining element 36 includes, transversely on either side of the hole 39, two ramps 46 sloping towards the centre of the hole 39, and which are designed to engage with the spherical head 18, thereby facilitating alignment of the spherical head 18 in relation to the hole 39 when the spherical head 18 is inserted into the capsule 10.

Here the edge of the hole 39 incorporates two diametrically opposed notches 42 in a direction perpendicular to the transverse direction "T", which are intended to allow the ramps 46 to move apart when the head 18 is inserted into the capsule 10.

With the capsule 10 not fitted with its retaining element 36 and the spherical head 18, as shown in FIG. 2, the retaining element 36 is introduced via the ends 22 of the seating 16 and is displaced by a transverse sliding motion inside the seating 16 until it is generally centred in the capsule 10, as illustrated in FIG. 4.

The spherical head 18 is then inserted into the capsule 10 by elastic deformation of the lugs 30 and the arms 32, until the head 18 is received in the seating 16 and is captive in the hole 39 of the retaining element 36, as shown in FIGS. 1 and 4. The head 18 thus retains its capacity to slide in the transverse direction "T" while being adequately held in position.

The invention therefore makes it possible, in addition to the retaining means afforded by the ends 34 of the arms 32, to provide additional support for the head 18 by means of the retaining surface 38, thereby ensuring reduced wear and tear on the capsule 10 and reducing the risk of maladjustment of the light beam from the lighting module mounted thereon.

What is claimed is:

1. Pivot capsule for a motor vehicle headlamp, comprising an end intended to be fixed to a rear face of a lighting module having a reflector, and an opposite end incorporating a seating receiving a substantially spherical head of a fixing rod of substantially axial orientation extending from a front face of a housing of the headlamp to allow the lighting module to pivot relative to the housing, in which the seating is open at its two transverse ends and comprises a bottom wall incorporating a channel formed into a portion of a cylinder of substantially transverse orientation and having a curvature corresponding to that of the spherical head, which receives the end of the substantially spherical head, and at least two parallel flexible retaining lugs extending with play on both sides of the channel and of the spherical head, and which comprises recurved arms turned towards the channel of which the ends, formed into a portion of a cylinder of substantially transverse orientation and having a curvature corresponding to that of the spherical head, bearing on the spherical head substantially at its junction with the rod to hold it securely in the channel, the capsule further includes an additional retaining element intended to be inserted via an open end of the seating and which includes at least one retaining surface which is intended to be located in contact with the spherical head to improve its means of support.

2. Pivot capsule according to claim 1, wherein the additional retaining element includes at least one retaining surface having a curvature corresponding to that of the spherical head.

3. Pivot capsule according to claim 1, wherein the additional retaining element is shaped in the form of a ring comprising a hole of which one edge delimits at least one retaining surface.

4. Pivot capsule according claim 3, wherein the hole includes a part which delimits a generally spherical retaining surface and of the same radius as the spherical head.

5. Pivot capsule according to claim 1, wherein the additional retaining element includes two flanges of transverse orientation each of which is located between the channel and the adjacent lug of the capsule, so as to guide the additional retaining element in a transverse sliding motion while holding the additional retaining element in an orientation perpendicular to the transverse direction.

6. Pivot capsule according to claim 1, wherein the additional retaining element includes at least one inclined ramp which is designed to engage with the spherical head to facilitate alignment of the spherical head relative to the additional retaining element.

* * * * *